Figure 1:
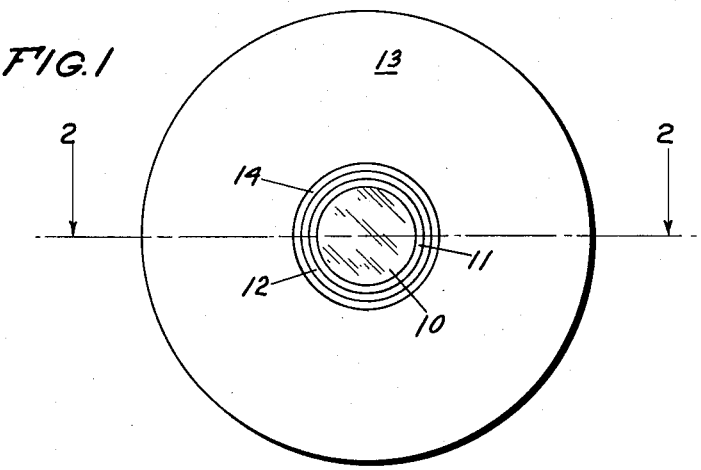

Nov. 1, 1955   D. W. HOSMER   2,722,496
CERAMIC TO METAL BONDING
Filed Oct. 1, 1951

INVENTOR
DOUGLAS W. HOSMER
BY
ATTORNEY

United States Patent Office 2,722,496
Patented Nov. 1, 1955

2,722,496

CERAMIC TO METAL BONDING

Douglas W. Hosmer, Newton Center, Mass., assignor to Raytheon Manufacturing Company, Newton, Mass., a corporation of Delaware Application October 1, 1951, Serial No. 249,081

1 Claim. (Cl. 154—128)

This application relates to metal to ceramic bonds and more particularly to the methods whereby such bonding may be accomplished.

When vacuum tubes are required to operate in the microwave region, the size of the tube must be reduced, making it small in comparison to the power it is called upon to dissipate. Certain dimensions of tubes designed to operate at these frequencies must be in the order of a fraction of the operating wave length. When tube elements carrying high currents are spaced as close as a fraction of an inch apart, highly elevated temperatures occur. When such tube elements are separated by glass, the glass is likely to soften and be sucked in, or otherwise distorted, affecting adversely the characteristics of the tube.

In magnetrons, for instance, as the seals run hotter, if they are of glass, the resistance decreases and the radio frequency losses increase reducing the efficiency of the equipment even though the glass may not be sucked in.

In processing such tubes, they are frequently heated to as high a temperature as possible while still connected to the exhaust system in order to bake out any gases that may be present in the tube parts. This is done to prevent such gases from escaping during the operation of the tube, thus spoiling the vacuum. The higher the temperature at which this baking out can be done, the more thorough and rapid the process can be made. The softening temperature of the glass parts limits the temperature at which the tube can be baked. Ceramics, particularly those composed largely of alumina, have a considerably higher softening point than glass, and so can be subjected safely to considerably higher temperatures than glass during processing and operation. Ceramics of alumina also have a greater response to mechanical shock than glass.

For these reasons, ceramics have been used in the manufacture of vacuum tubes. One of the problems in their use is the formation of vacuum tight seals between the ceramic body and the metal parts. Seals of this type were first developed for the steatite ceramics. My U. S. Patent No. 2,619,432, issued November 25, 1952, on application, Serial No. 71,129 filed January 15, 1949, discloses methods for forming ceramic to metal seals where the ceramic is composed chiefly of zirconium silicate. These zircon ceramics have been found to be superior to steatite ceramics with respect to heat and mechanical shock resistance. Alumina ceramics have been found to be even more resistant to heat and mechanical shock than the zircon ceramics. In addition, the alumina ceramic bodies have an exceptionally high tensile strength for a ceramic and have greater thermal conductivity than other ceramics.

The tensile strength of the alumina allows the body to be soldered to metals of slightly different coefficient of expansion without cracking. This permits higher bakeout temperatures to be used while processing and in operation.

The improved thermal conductivity of the alumina ceramics helps to prevent temperature gradients from being set up in the ceramic body and thereby reduces the chances of breakage from heat shock.

The electrical properties of the alumina ceramics are at least as good as those of the zircon or steatite ceramics.

Because of these superior qualities of the alumina ceramics, it is desirable to be able to form a bond between such bodies and metal. By the use of the methods of this invention, such seals can be formed.

By one of the methods of the invention, an alumina ceramic to metal seal is formed by coating the area of the ceramic to be bonded with a layer of molybdenum powder and heating the surface, after which a layer of nickel powder is added and heated to form a surface to which metal parts may be soldered.

Figure 2:
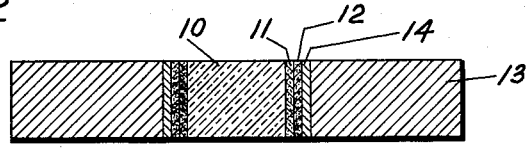

Other and further advantages of this invention will be apparent as the description thereof progresses, reference being had to the accompanying drawings, wherein:

Fig. 1 is a plan view of a metal member having an alumina ceramic body bonded to it by the method of this invention; and Fig. 2 is a cross-sectional view of the metal member ceramic body and bond taken along the line 2—2 of Fig. 1.

In Fig. 1, the reference numeral 10 refers to the ceramic body made largely of alumina, aluminum oxide ($Al_2O_3$) which has the desirable features mentioned above. For the purposes of illustration only, this ceramic body has been shown in the form of a circular disk. This body may be the ceramic envelope of a vacuum tube.

In the first of the methods mentioned above, a coating 11 is added to the edge of the ceramic body 10 that is to be bonded to the metal member. This coating comprises finely-divided particles, approximately three microns in size, of molybdenum suspended in a binder, such as a solution of nitro-cellulose in amyl acetate. This layer may be applied by spraying, or any other convenient method, until a layer between 0.001 to 0.0015 inch is built up. The coated surface is then heated at a temperature of 1600 degrees to 1650 degrees centigrade and held at that temperature for fifteen to twenty minutes, whereupon the binder is completely evaporated, leaving the coating of molybdenum firmly adhering to the ceramic surface.

When the first coating has cooled, a second coating 12 comprising finely-divided nickel particles, for example, three microns in diameter, suspended in a binder, such as that described above, is applied to the molybdenum coating 11 by spraying to it, or any other convenient method, to build up a coating of similar thickness. The surface is then heated to a temperature of over 1000 degrees centigrade, preferably 1140 degrees centigrade, for about thirty minutes to completely evaporate the binder and leave a firm coating of nickel adhering to the coating of molybdenum.

After the second coating has cooled, any desired metal member, such as the annular piece 13 shown in Figs. 1 and 2, may then be soldered to this coating 12. The member 13 may be, for example, of copper and have thereon a hole slightly larger than the diameter of the ceramic disk 10 including the coatings 11 and 12. When the member 13 is placed around the disk 10, the solder 14 is inserted in the space between the disk 10 and the metal member 13. This solder may be of any desired type, such as one of the standard lead-tin solder mixtures, a silver solder, or a gold-copper solder mixture. The assembly is then placed in an oven and heated to above the melting point of the solder, whereupon the solder firmly adheres to the coating of nickel 12 and to the member 13 so that upon cooling a firm bond is produced between the metal member 13 and the ceramic 10. The metal member 13 may, if desired, be brazed or welded to the metal coating rather than soldered.

Due ot the fact that the alumina ceramic may be even more rapidly heated and cooled than the zirconium silicate ceramic used for the ceramic to metal bond disclosed in my U. S. Patent No. 2,619,432 referred to above, a bond may be produced between an alumina ceramic and a metal in considerably less than the three hours required for the zircon ceramic to metal bond.

Furthermore, since the alumina ceramic has a high tensile strength, and since the process described herein produces an extremely strong bond, the alumina ceramic and metal structure is substantially as strong as one made entirely of metal.

While the ceramic body has been referred to as an alumina ceramic, it is not solely composed of alumina. In addition to about ninety-five per cent alumina, there are various flux materials present, principally mullite, or aluminum silicate ($3Al_2O_3 \cdot 2SiO_2$). These fluxes perform the function of joining the hard crystalline particles of alumina together with an amorphous gas tight glass-like substance to form a gas tight body. If a vacuum tight structure is not required, the ceramic body may be pure alumina without fluxes.

While the coating described here and their method of application produce the best results, any mixture of metals could be used for the coating which would adhere to the ceramic, or any metal compounds could be used for the coating which would reduce, upon heating, to a metal which would bond to the ceramic and the solder.

The binder used to hold the divided metal particles that are sprayed on to the ceramic to form the coatings may be any of the standard commercial binders in use which will evaporate leaving no residue.

This invention is not limited to the particular details of construction, materials and processes described, as many equivalents will suggest themselves to those skilled in the art. It is accordingly desired that the appended claim be given a broad interpretation commensurate with the scope of the invention within the art.

What is claimed is:

The method of forming a vacuum tight seal between an alumina ceramic portion and a metal portion in a vacuum tight envelope, comprising the steps of applying a layer of finely-divided molybdenum to the ceramic portion of the envelope, heating said ceramic portion at a temperature of 1600 to 1650 degrees centigrade to bond said layer of molybdenum to said ceramic portion, applying a layer of finely-divided nickel to said layer of molybdenum, heating said ceramic portion to about 1000 degrees centigrade to bond said layer of nickel to said layer of molybdenum and applying solder between said ceramic portion and said metal portion to bond said portions to form a vacuum tight seal.

References Cited in the file of this patent

UNITED STATES PATENTS

| | | |
|---|---|---|
| 2,282,106 | Underwood | May 5, 1942 |
| 2,570,248 | Kelly | Oct. 9, 1951 |
| 2,619,432 | Hosmer | Nov. 25, 1952 |

FOREIGN PATENTS

| | | |
|---|---|---|
| 573,142 | Great Britain | Nov. 8, 1945 |
| 625,371 | Great Britain | June 27, 1949 |

OTHER REFERENCES

Metal-Ceramic Brazed Seals. R. J. Bondley. Electronics, vol. 20, pp. 97–99, 7–1947.